US008358811B2

(12) United States Patent
Adams et al.

(10) Patent No.: US 8,358,811 B2
(45) Date of Patent: Jan. 22, 2013

(54) METHOD AND APPARATUS TO INCORPORATE AUTOMATIC FACE RECOGNITION IN DIGITAL IMAGE COLLECTIONS

(75) Inventors: Hartwig Adams, Los Angeles, CA (US); Johannes Steffens, Westoverledingen (DE); Keith Kiyohara, Santa Monica, CA (US); Hartmut Neven, Malibu, CA (US); Brian Westphal, Reno, NV (US); Tobias Magnusson, Los Angeles, CA (US); Gavin Doughtie, Pasadena, CA (US); Henry Benjamin, Sherman Oaks, CA (US); Michael Horowitz, Manhattan Beach, CA (US); Hong-Kien Kenneth Ong, Rancho Santa Fe, CA (US)

(73) Assignee: Google Inc., Mountain View, CA (US)

( * ) Notice: Subject to any disclaimer, the term of this patent is extended or adjusted under 35 U.S.C. 154(b) by 959 days.

(21) Appl. No.: 12/416,632

(22) Filed: Apr. 1, 2009

(65) Prior Publication Data
US 2009/0252383 A1 Oct. 8, 2009

Related U.S. Application Data

(60) Provisional application No. 61/041,883, filed on Apr. 2, 2008, provisional application No. 61/050,514, filed on May 5, 2008.

(51) Int. Cl.
*G06K 9/00* (2006.01)
*G06F 7/00* (2006.01)
(52) U.S. Cl. .................................. 382/118; 707/705
(58) Field of Classification Search .......... 382/115–118, 382/220, 224, 305, 312, 173, 225; 713/182, 713/186; 707/5–6, 9, 705, 737
See application file for complete search history.

(56) References Cited

U.S. PATENT DOCUMENTS
7,634,662 B2 * 12/2009 Monroe ...................... 713/186
(Continued)

OTHER PUBLICATIONS

International Preliminary Report on Patentability and Written Opinion of the international Searching Authority for International Application No. PCT/US2009/002014, mailed on Oct. 14, 2010, 6 pages.

(Continued)

*Primary Examiner* — Kanjibhai Patel
(74) *Attorney, Agent, or Firm* — Sterne, Kessler, Goldstein & Fox P.L.L.C.

(57) ABSTRACT

A method and apparatus for creating and updating a facial image database from a collection of digital images is disclosed. A set of detected faces from a digital image collection is stored in a facial image database, along with data pertaining to them. At least one facial recognition template for each face in the first set is computed, and the images in the set are grouped according to the facial recognition template into similarity groups. Another embodiment is a naming tool for assigning names to a plurality of faces detected in a digital image collection. A facial image database stores data pertaining to facial images detected in images of a digital image collection. In addition, the naming tool may include a graphical user interface, a face detection module that detects faces in images of the digital image collection and stores data pertaining to the detected faces in the facial image database, a face recognition module that computes at least one facial recognition template for each facial image in the facial image database, and a similarity grouping module that groups facial images in the facial image database according to the respective templates such that similar facial images belong to one similarity group.

24 Claims, 16 Drawing Sheets

U.S. PATENT DOCUMENTS

Figure 1:
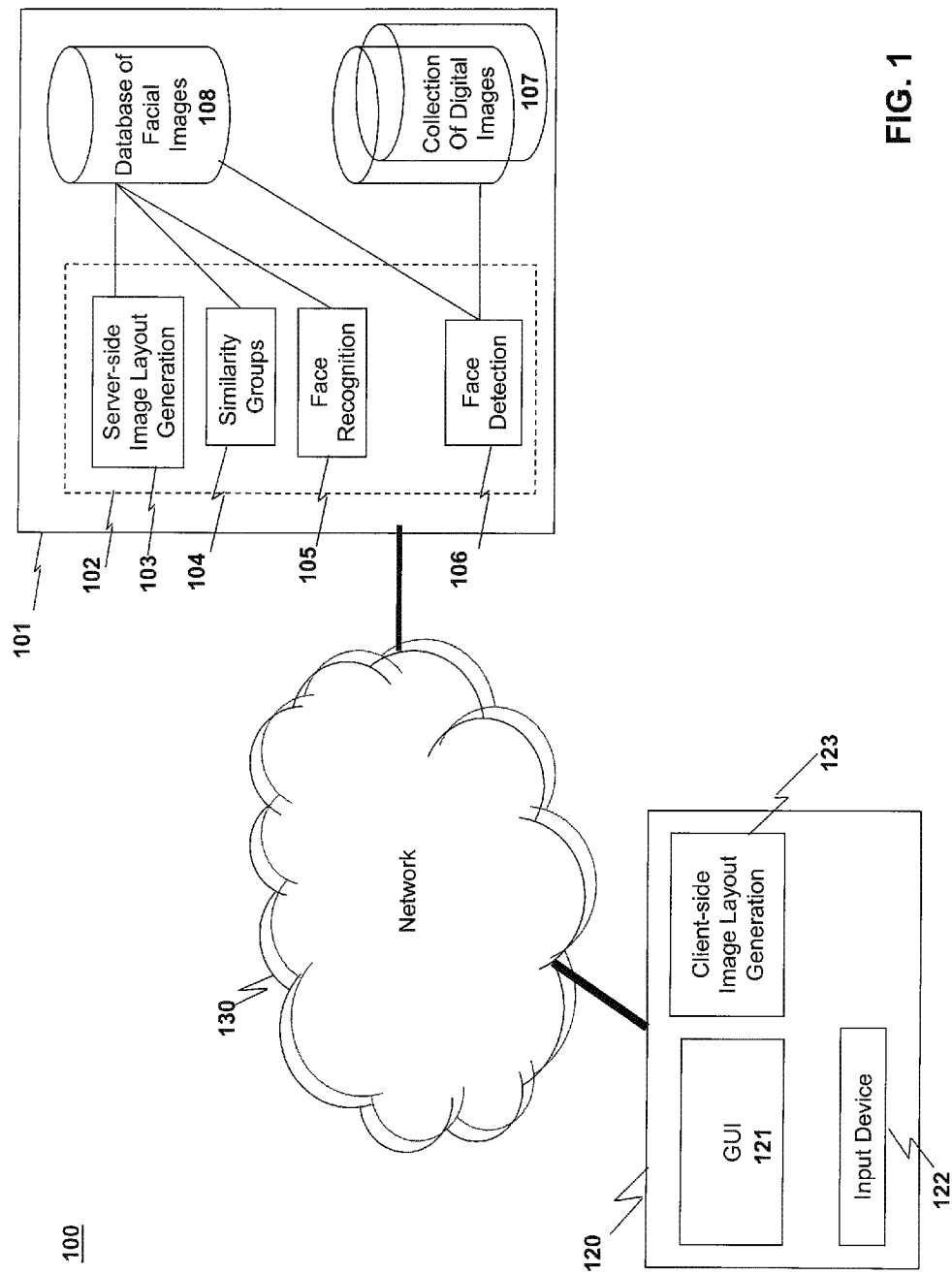

| | | | | |
|---|---|---|---|---|
| 7,646,895 | B2* | 1/2010 | Haupt et al. | 382/115 |
| 7,702,185 | B2* | 4/2010 | Keating et al. | 382/305 |
| 7,962,467 | B2* | 6/2011 | Howard et al. | 707/706 |
| 7,965,908 | B2* | 6/2011 | Hayashi | 382/305 |
| 8,086,867 | B2* | 12/2011 | Freeman et al. | 713/186 |
| 2001/0043727 | A1 | 11/2001 | Cooper | |
| 2003/0210808 | A1 | 11/2003 | Chen et al. | |
| 2004/0264810 | A1 | 12/2004 | Taugher et al. | |
| 2005/0105806 | A1 | 5/2005 | Nagaoka et al. | |
| 2006/0078201 | A1 | 4/2006 | Kim et al. | |
| 2007/0239764 | A1 | 10/2007 | Song et al. | |

OTHER PUBLICATIONS

The International Search Report as cited in PCT/US2009/002014, dated Aug. 12, 2009.

Das et al., "Automatic Face-based Image Grouping for Albuming", 2003, IEEE, International Conference on Systems, Man, and Cybernatics, pp. 3726-3731.

Zhang et al., "Automated Annotation of Human Faces in Family Albums", Proceedings of the 11$^{th}$ ACM International Conference on Multimedia,, Nov. 2-8, 2003, Berkeley, CA, 4 pages.

http://www.riya.com/learnMoreS5, (Retrieved on Oct. 12, 2007), 1 page.

http://www.techcrunch.com/2006/12/19/polar-rose-europes-entrant-into-facial-recognition/, (Retrieved on Oct. 11, 2007), 2 pages.

http://searchengineland.com/061219-091641.php, (Retrieved on Oct. 11, 2007), 5 pages.

Examination Report for EP Application No. EP 09727089.6, European Patent Office, Netherlands, dated Sep. 11, 2012 (5 pages).

* cited by examiner

METHOD AND APPARATUS TO INCORPORATE AUTOMATIC FACE RECOGNITION IN DIGITAL IMAGE COLLECTIONS

CROSS REFERENCE TO RELATED APPLICATIONS

This application claims the benefit of U.S. provisional application No. 61/041,883, filed on Apr. 2, 2008, and U.S. provisional application No. 61/050,514, filed on May 5, 2008, both of which are hereby incorporated by reference in their entirety.

TECHNICAL FIELD

This invention relates in general to digital image collections, and more particularly, to the use of automatic face recognition within digital image collections.

BACKGROUND

The digital camera, cheap digital storage, and extensive network connectivity through the Internet have brought about a large growth in the number, size, and access of distributed photo collections. However as the availability of digital photos and digital photo collections grows, searching for particular photos or photos containing particular characteristics becomes increasingly cumbersome.

Individuals may organize their digital photo collections in folders by album name or by date. However, one may often want to access photos across these folders. For example, one may want to find photos of a particular individual in a collection. To facilitate such search activity based on content of photographs, a number of techniques may be used. The tagging of each photograph with one or more keywords is one such technique.

Generally, the tagging of each photograph is done by the user, who manually provides the tags or tag words. In addition, such tags may be derived from information related to each photograph, such as, date, album or folder information. However, these approaches require significant user input, and generally do not scale well to large digital photo collections. The automatic tagging of photos using automatic face recognition techniques is a promising approach to achieving comprehensive tagging of large photo collections.

Automatic face recognition, in general, functions in two stages: a face detection stage, and a face recognition stage. The former can be accomplished by automatically picking out faces in a photograph based on general facial characteristics. The latter may include the comparison of the detected faces against one or more of facial images that have been previously recognized. The accuracy of the second stage increases when there are multiple identified and confirmed images of a particular face, against which a newly detected face can be compared.

The effectiveness of automatic face recognition in large digital image collections can be limited due to not having a sufficient number and variety of facial images of each person being identified and confirmed by a user, and due to erroneous identification. The presently available interfaces that allow a user to identify and confirm faces found in digital photo collections attempt to make it easier for the user to identify many facial images at a time. For example, one interface may present the user with facial images potentially belonging to a particular identified person, arranged in one or more rows, and ask the user to either confirm or reject that system-generated classification. Another interface may present the user with one or more naming options for a particular face newly detected in a photo. In the first case, for example, the user is tasked with deleting each individual face that does not belong to the listed collection. In the second case, the user is tasked with tagging each individual image with a name. In both of the above cases, it is still cumbersome to weed out images and name individual images. More user-friendly and efficient methods are necessary to make the task of identifying multiple images at a time convenient and efficient, such that automatic face recognition may be exercised across the entire digital photo collection.

Users need a flexible capability that would automate much of the process. Automatic face recognition, leveraging a larger variety of images of a particular person, would be more capable of categorizing and arranging detected facial images for user confirmation, such that the confirmation process would be made easier to the user, and thereby facilitating the tagging of larger numbers of images.

SUMMARY

Embodiments of the present invention relate to integrating automatic face recognition into organization of digital image collections. In one embodiment, a method for creating and updating a facial image database from a collection of digital images is implemented. Facial images are detected in images from a collection of digital images. The detected facial images are grouped into similarity groups based on a facial recognition template computed for each of the detected facial images. The detected facial images are displayed to the user in similarity groups, and user input is received to confirm or reject individual facial images in each of the displayed similarity groups. Each of the similarity groups are updated based on the received user input, and the updated similarity groups are stored in a facial image database.

In another embodiment, a subject name, such as, for example, a name of a person, is received from the user. A first set of facial images from at least one named similarity group of facial images stored in a facial images database is retrieved where a name associated with the retrieved similarity group substantially matches the subject name provided by the user. A second set of facial images is retrieved from similarity groups in the facial images database that have no associated name and have facial recognition templates that substantially match the facial recognition template of the first set of facial images. The first set and the second set are displayed in a graphical user interface in a cluster. User input is received to confirm or reject membership of individual facial images in the displayed similarity groups of the second set, and the second set is updated according to the user input. In one embodiment, the first set is displayed as a cluster and the second set is displayed with each similarity group as a cluster. In another embodiment, the first set is displayed in a first area of the graphical user interface, and the second set is displayed in a second area with images arranged in order of similarity to the first set Another embodiment includes a naming tool for assigning names to a plurality of faces detected in a digital image collection. A facial image database stores data pertaining to facial images detected in images of a digital image collection. In addition, the naming tool may include a graphical user interface, a face detection module that detects faces in images of the digital image collection and stores data pertaining to the detected faces in the facial image database, a face recognition module that computes at least one facial recognition template for each facial image in the facial image database, and a similarity grouping module that groups facial images in the facial image database according to the respective templates such that similar facial images belong to one similarity group.

Yet another embodiment includes a method of accessing a collection of digital images. The system obtains a subject name, selects a set of facial images in a facial image database that are assigned the subject name, and finds digital images from a collection of digital images that are associated with the selected facial images. In one embodiment the found digital images can be displayed as a personalized slide show.

Still another embodiment includes a method of searching for images of a person utilizing multiple source facial images. The system receives a subject name, selects a set of facial images from a facial image database that are assigned the subject name, and searches one or more digital image collections with face recognition using the selected set of source images.

Another embodiment includes a method providing restricted access to a set of images in a digital image collection. A user is authenticated to access facial images assigned a subject name. A set of facial images that are assigned the subject name is selected, and the user is allowed to access those images in an image collection.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

FIG. 1: A system view of an embodiment of the invention.

Figure 2:
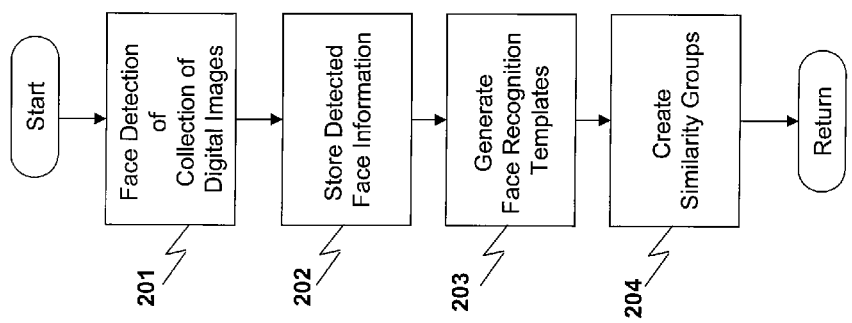

FIG. 2: A method of updating the facial image database, in one embodiment of the invention, with newly detected faces.

Figure 3:
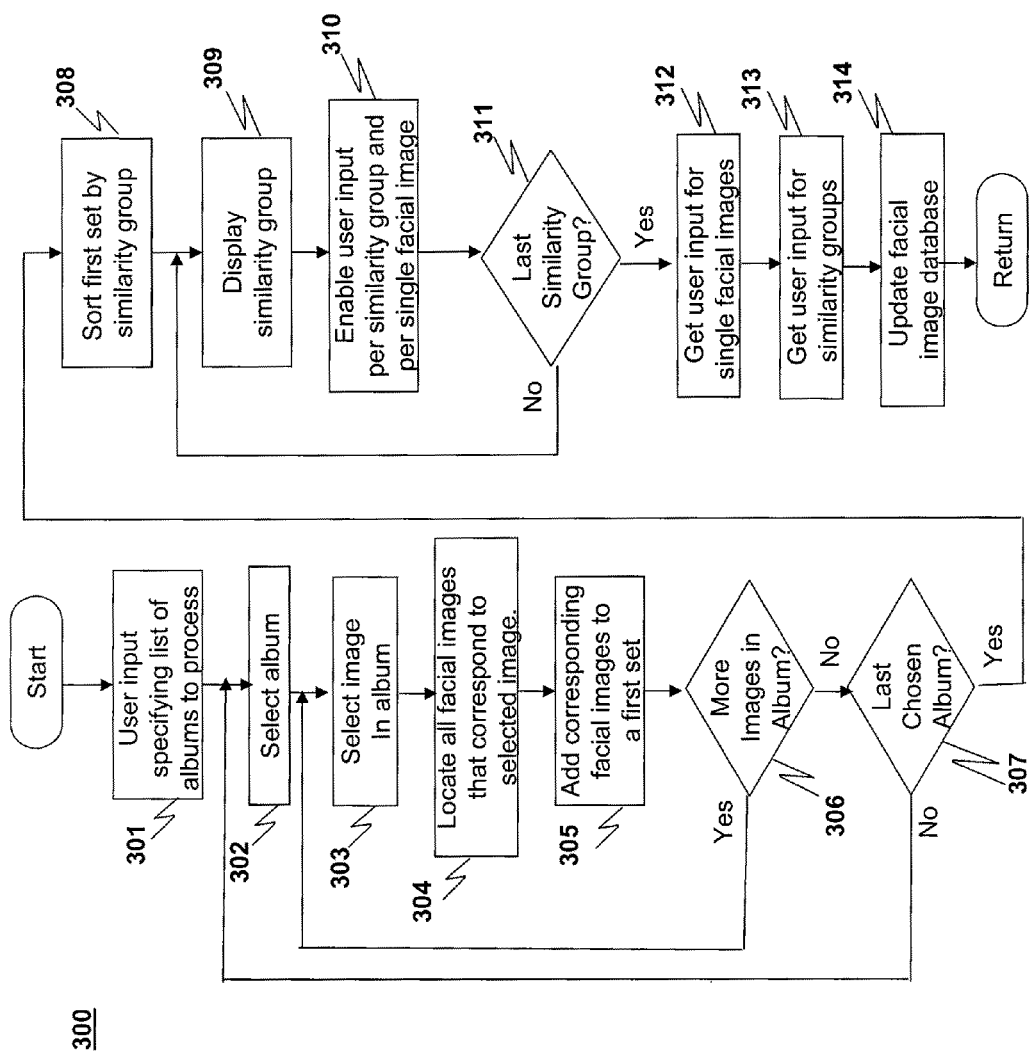

FIG. 3: A method of naming faces using album-based lookup, in one embodiment.

Figure 4:
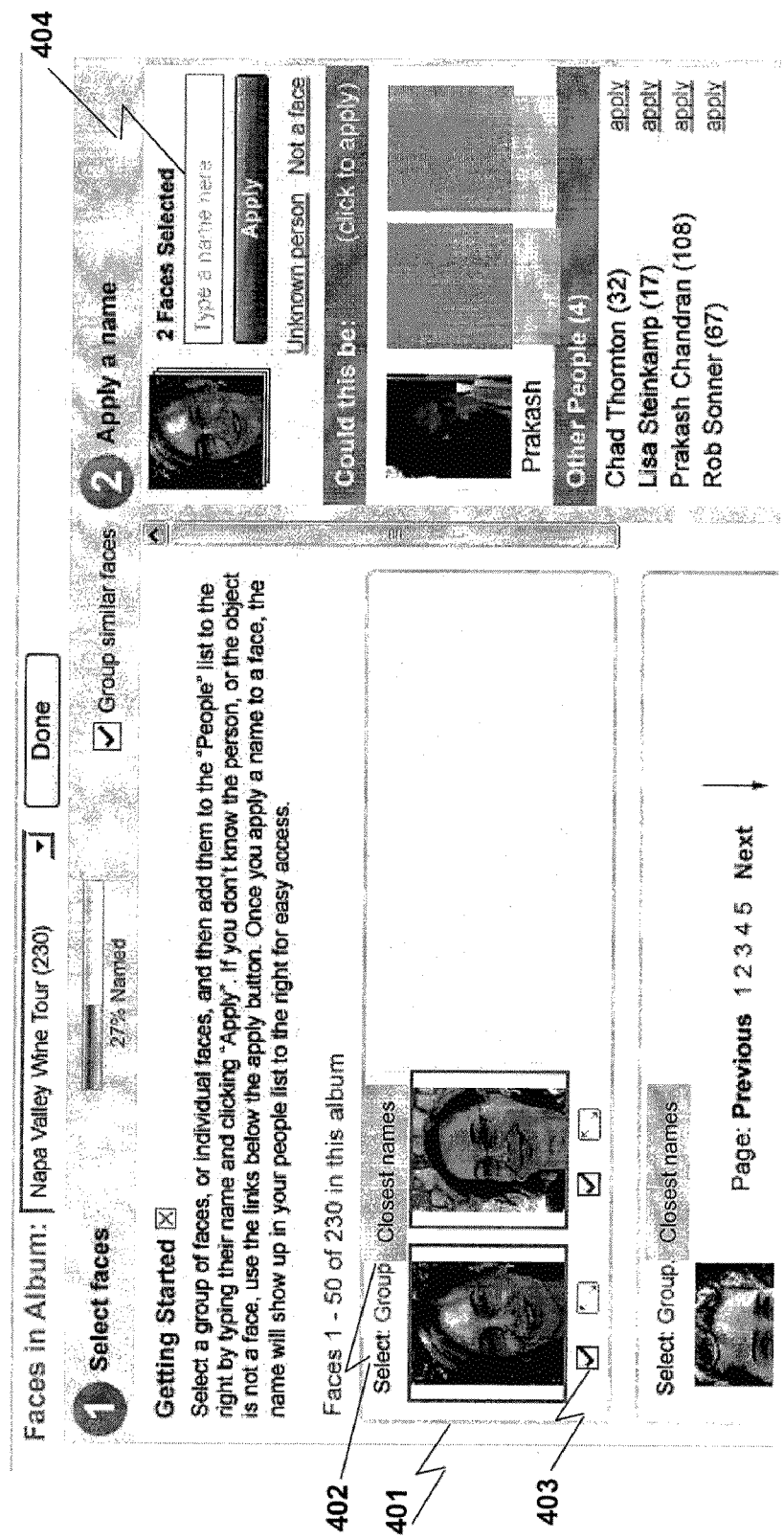

FIG. 4: A graphical user interface (GUI) instance view of naming faces based on album-based lookup, in one embodiment.

Figure 5:
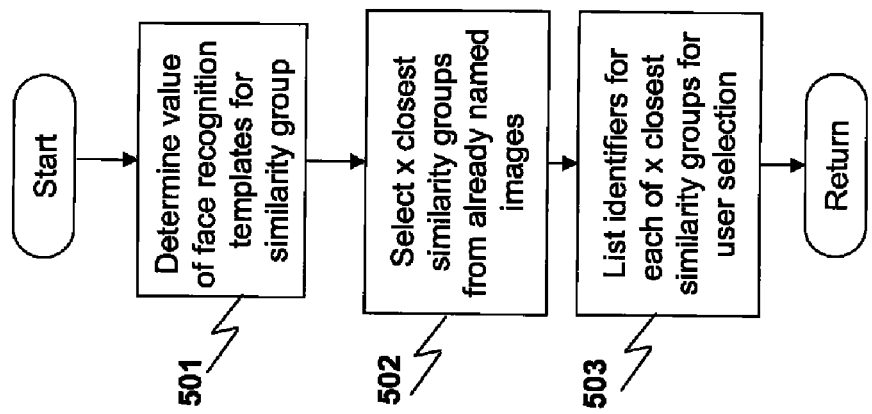

FIG. 5: A method of presenting the user, in one embodiment of the invention, with the closest name choices with which to name a similarity group.

Figure 6:
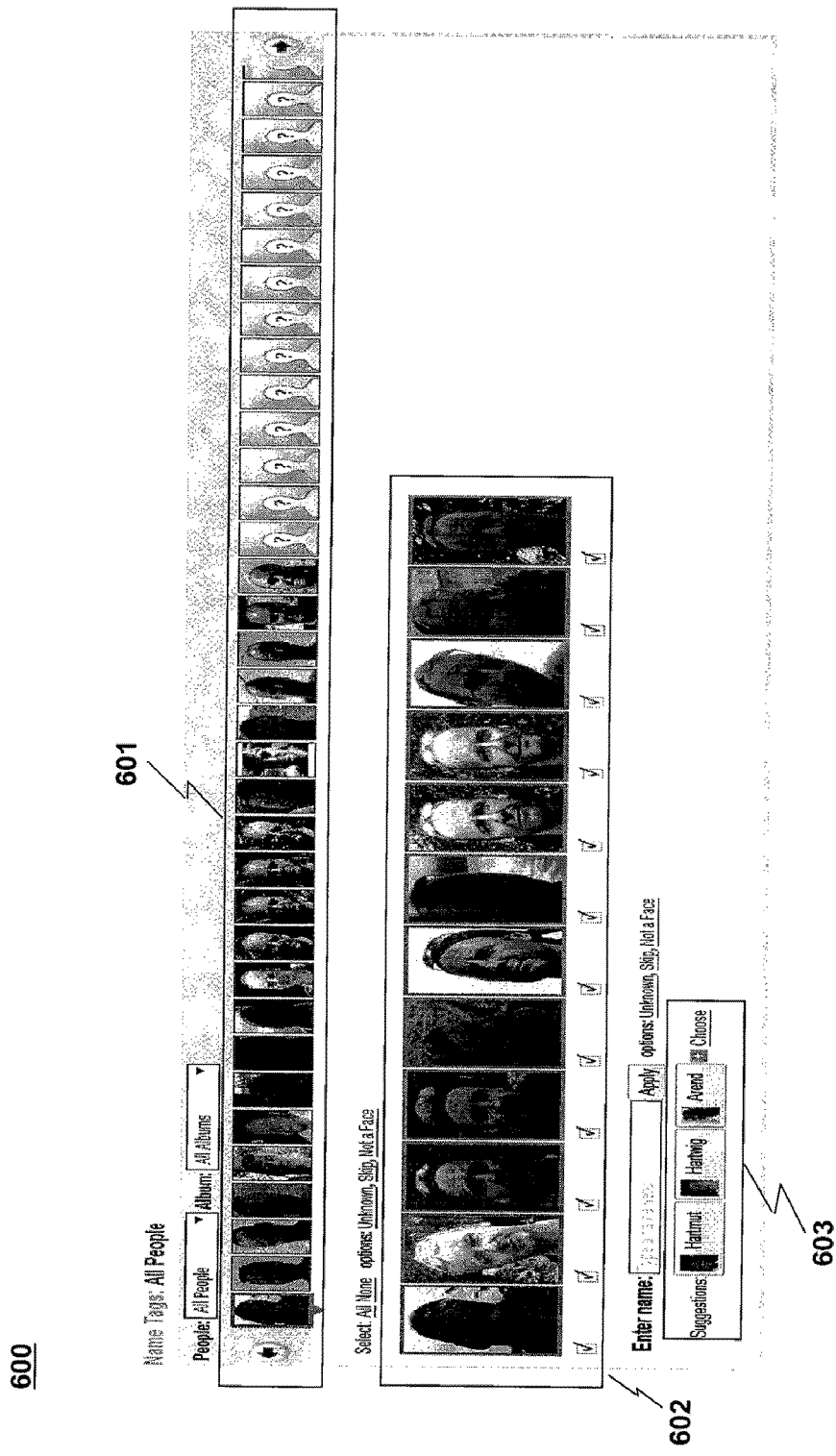

FIG. 6: An instance view of a filmstrip GUI-based naming tool that can be used to name facial images in similarity groups according to an embodiment of the present invention.

Figure 7:
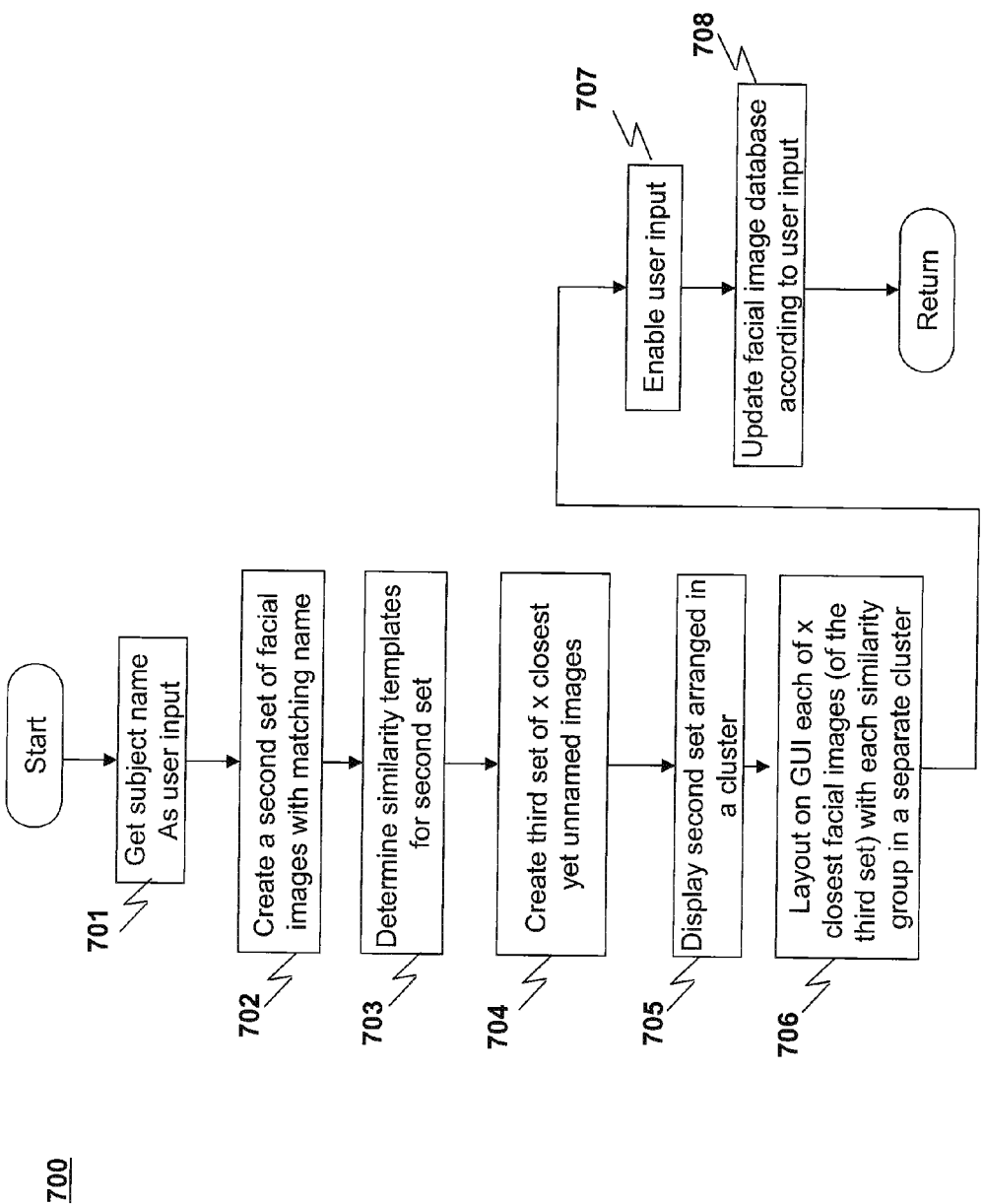

FIG. 7: A method of naming, in one embodiment, yet unnamed facial images of a subject specified by a user.

Figure 8:
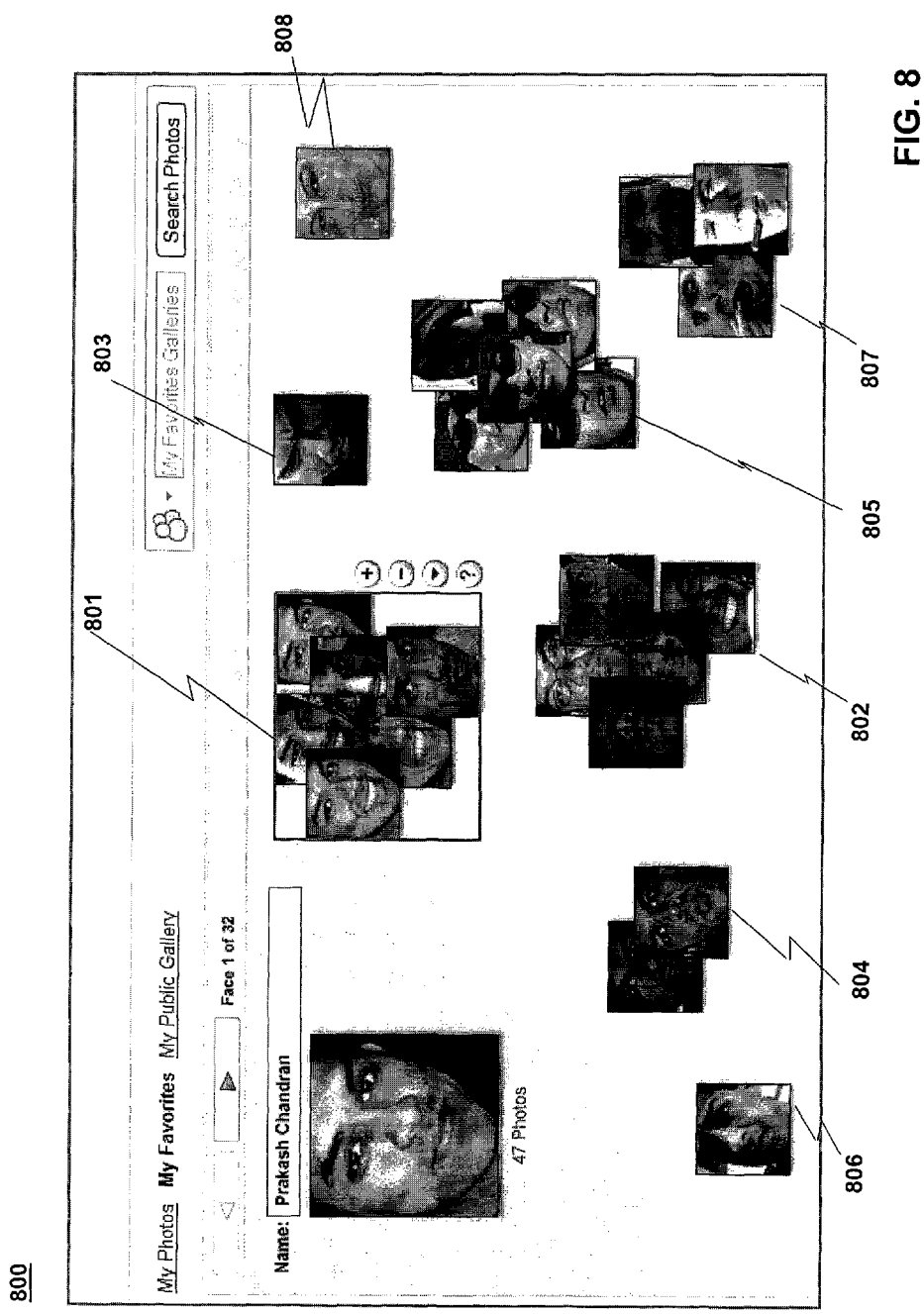

FIG. 8: A GUI instance view of naming, in one embodiment, all yet unnamed facial images of a subject name specified by a user.

Figure 9:
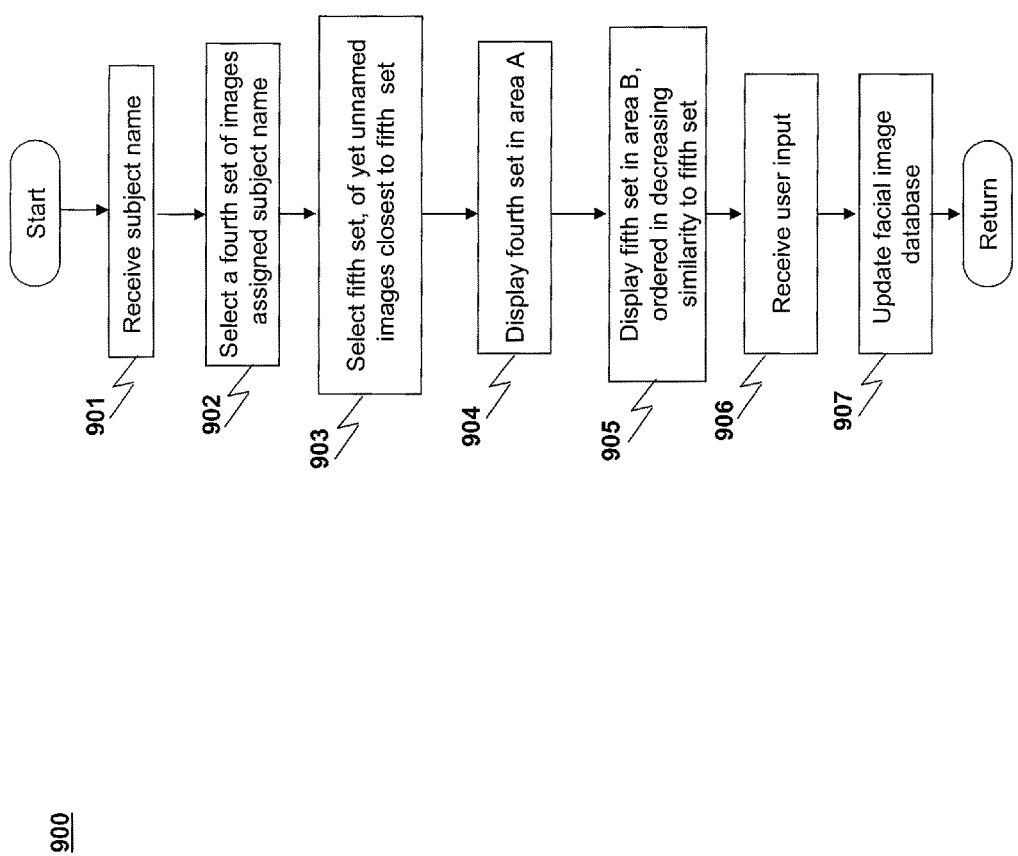

FIG. 9: A method of viewing and selecting, in one embodiment, images assigned to a subject in one area, and similar images yet to be named in another area.

Figure 10:
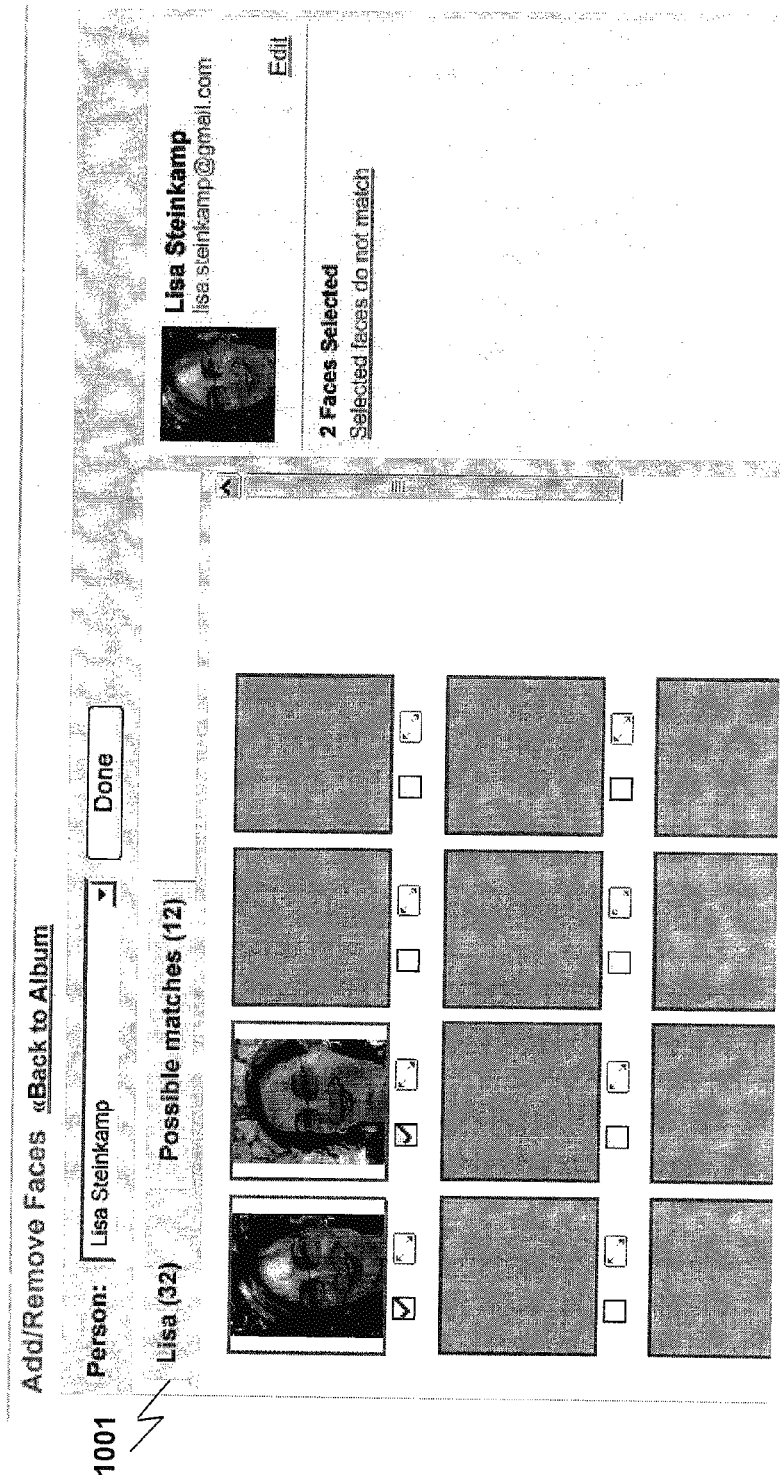

FIG. 10: Another GUI instance view of naming, in one embodiment, yet unnamed facial images of a subject name specified by a user.

Figure 11:
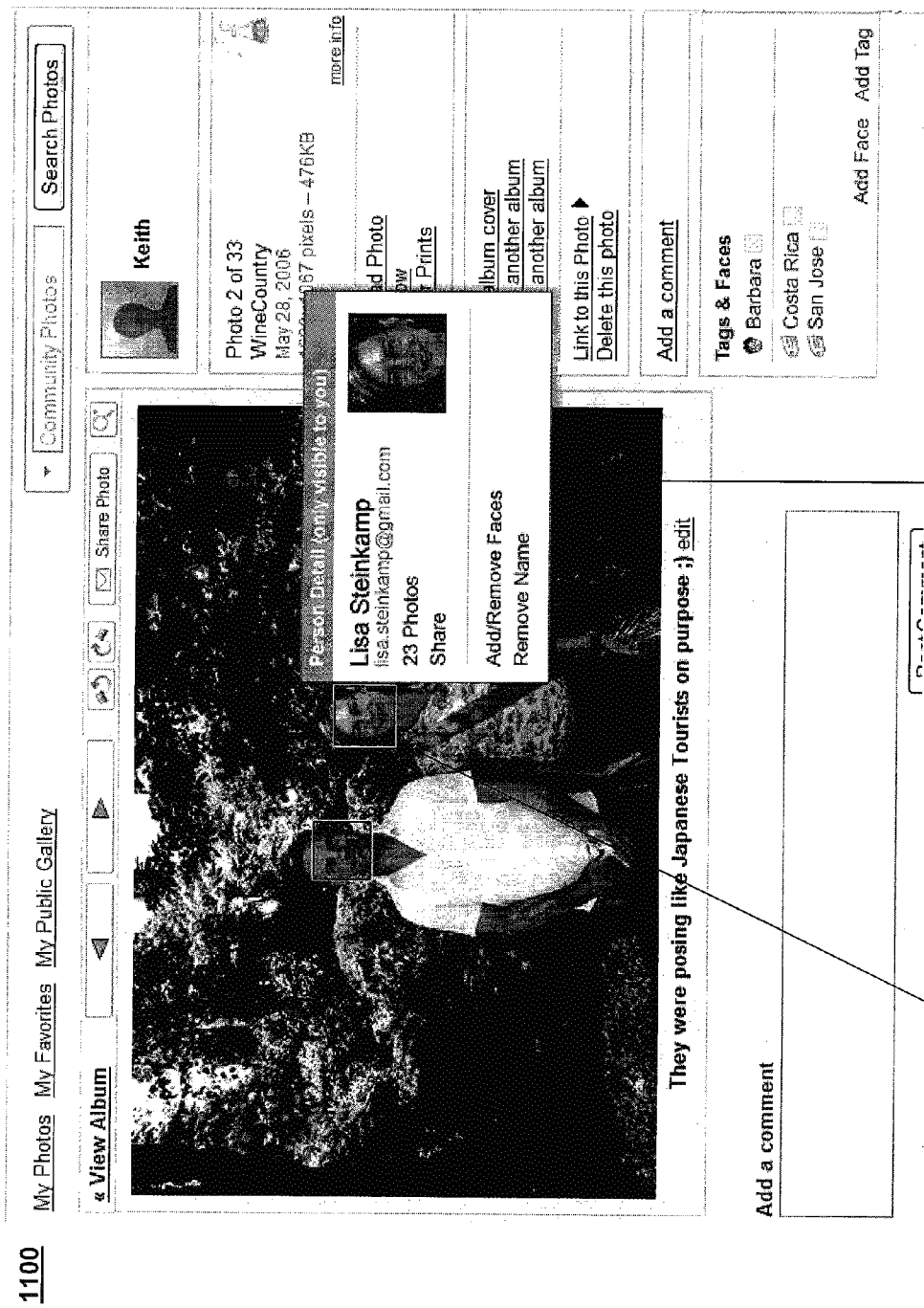

FIG. 11: A GUI instance view of performing manually assisted face detection, as per an embodiment of the invention.

Figure 12:
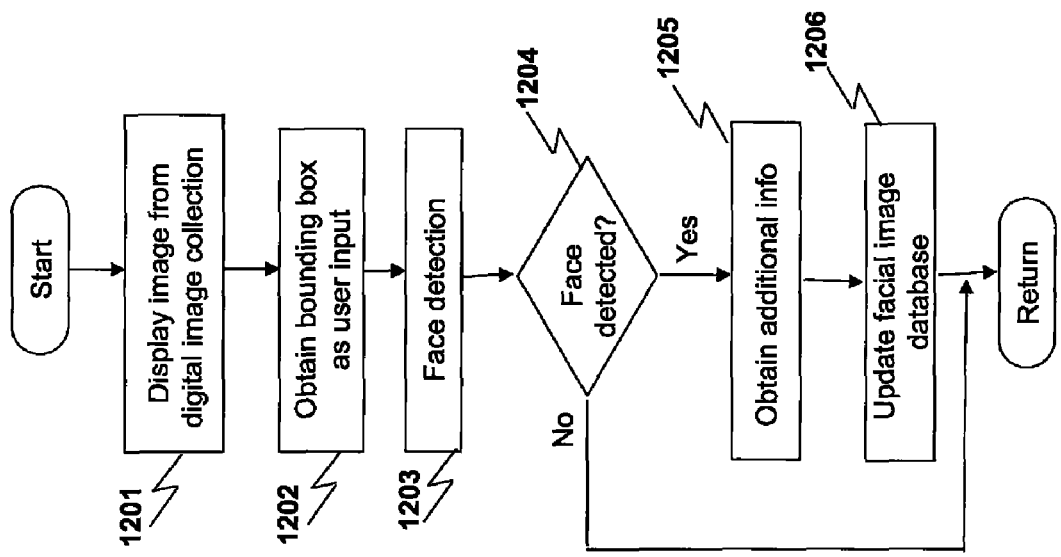

FIG. 12: A method of performing manually assisted face detection, as per an embodiment of the invention.

Figure 13:
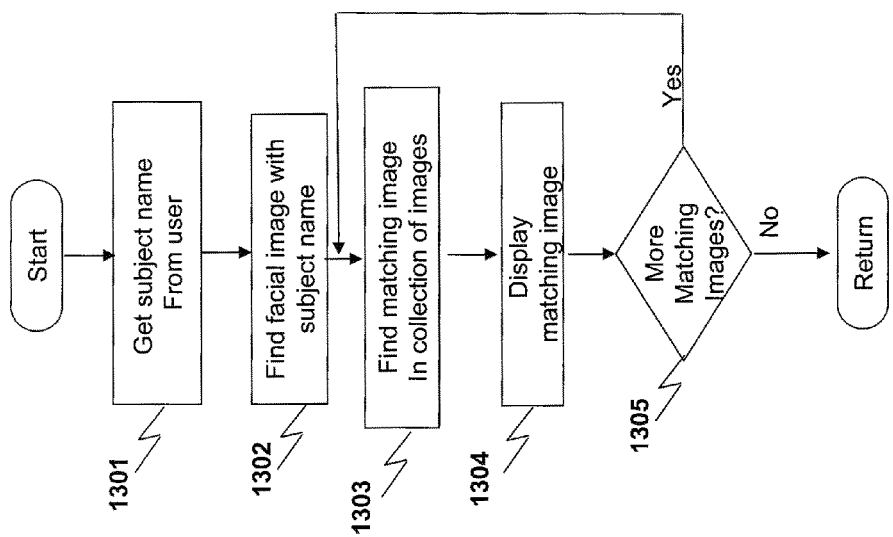

FIG. 13: A method of displaying personalized slideshows, according to an embodiment of the invention.

Figure 14:
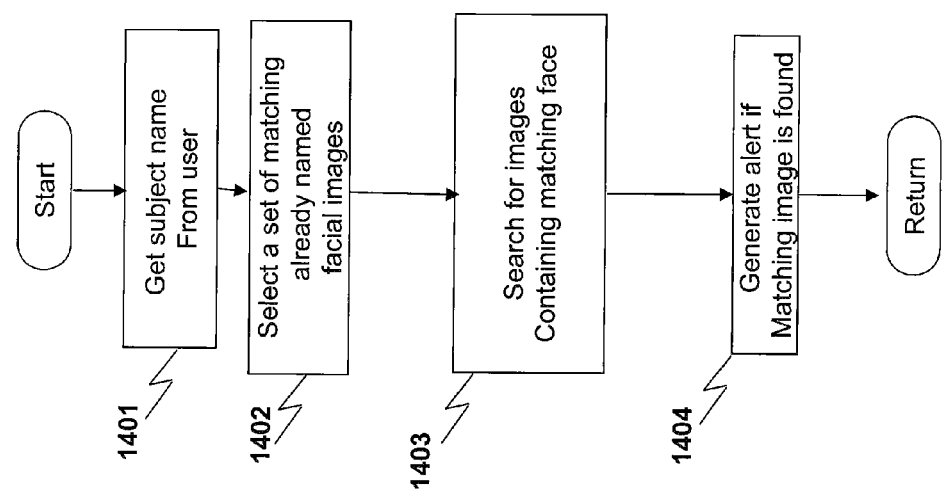

FIG. 14: A method of searching for a subject in an image collection, according to an embodiment of the invention.

Figure 15:
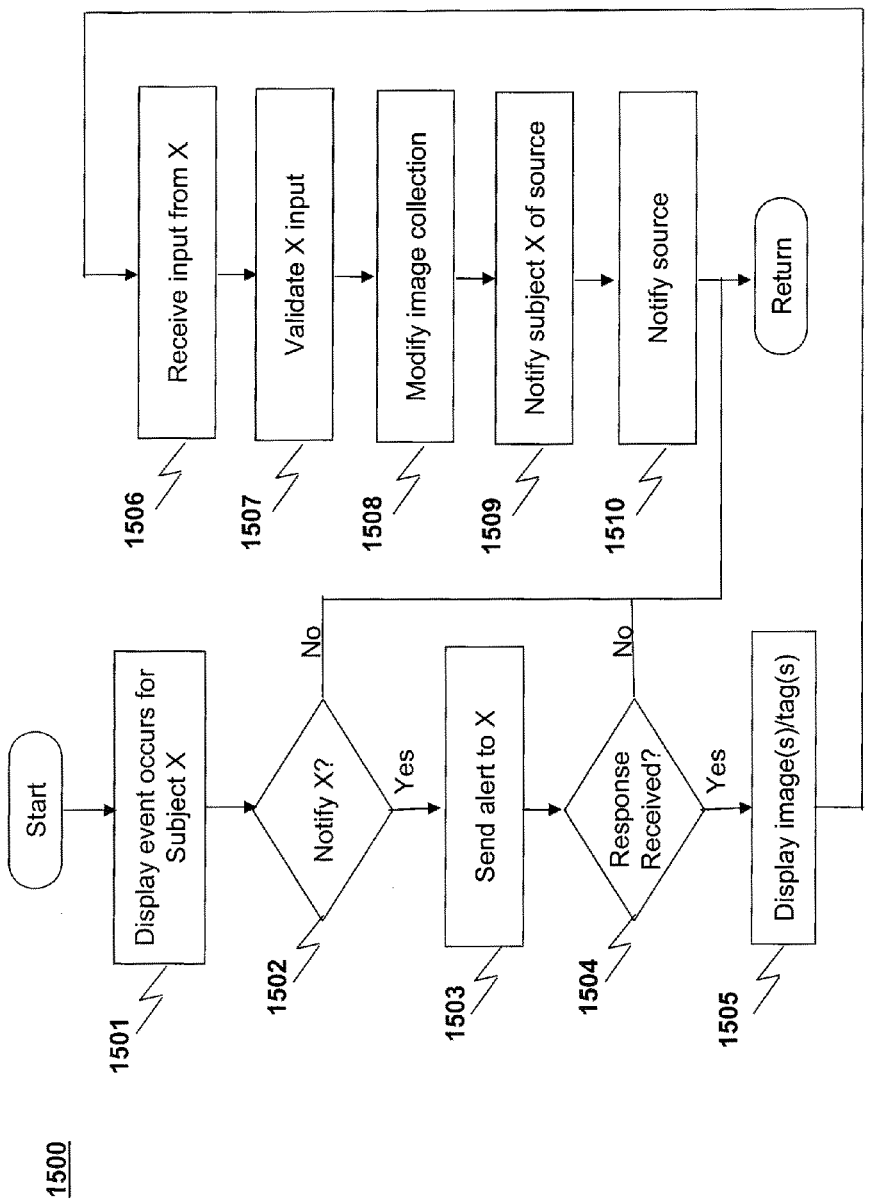

FIG. 15: A method by which a user is notified when an image possibly containing his face is added to an image collection, according to an embodiment of this invention.

Figure 16:
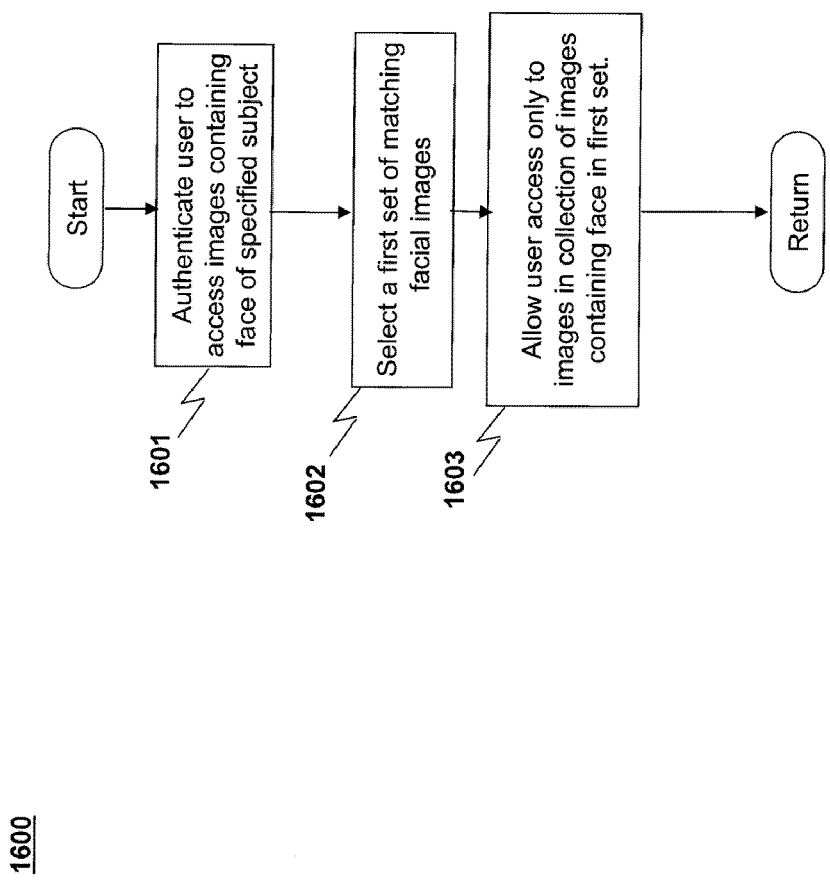

FIG. 16: A method of restricting user access to part of an image collection, according to an embodiment of the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF EMBODIMENTS

While the present invention is described herein with reference to illustrative embodiments for particular applications, it should be understood that the invention is not limited thereto. Those skilled in the art with access to the teachings herein will recognize additional modifications, applications, and embodiments within the scope thereof and additional fields in which the invention would be of significant utility.

FIG. 1 is a diagram of a system 100, according to an embodiment of the present invention, for incorporating automatic face recognition in digital image collections. A server 101 is connected to a client 120 through a network 130. Server 101 may comprise software modules 102. These may include modules for face detection 106, face recognition 105, creating and maintaining similarity groups 104, and image layout generation on the server-side 103; a database of facial images 108; and a collection of digital images 107. In one embodiment, server 101 may be one computing platform, and software modules 102 and databases 107-108 may be implemented on that same platform.

In another embodiment, server 101 may comprise multiple computing platforms interconnected by one or more networks. Software modules 102 and databases 107-108 may be distributed over the computing platforms that server 101 is comprised of, and communication among the modules 102 and databases 107-108 may occur using some messaging mechanism, for example, HTTP, UDP, TCP, IP, or any combination thereof. For example, server 101 may be comprised of: a web server that receives and responds to requests from web clients or browsers; a separate application server that enables image management and automatic face recognition functionality for users and that receives commands from the web server; and one or more database servers that communicate with the application server to enable the collection of digital images 107 and the database of facial images 108. Systems combining the use of web servers, application servers, and database servers, are well known in the art.

Modules 103-106 represent functionality in implementing embodiments of the present invention. One skilled in the art will understand that more or less modules than shown in 102 may be implemented in software to achieve the functionality of the present invention. Each of the modules 103-106 may be implemented using one or a combination of computer programming languages, for example and without limitation, Java, C++, and C.

In some embodiments, each database 107 and 108 may comprise one or more interconnected databases. For example, collection of digital images 107 may comprise an aggregation of multiple distributed collections of digital images, where the distributed collections may be owned by the same or different users. For example, the collections may comprise digital photo albums of one or more users. A currently available example may be a set of user albums in Google's PICASA web-based digital photo service. Although referred to here as a database, one skilled in the art will understand that collection of digital images 107 may be implemented as any mechanism that stores digital images accompanied by the ability to search and retrieve desired images.

Database of facial images 108 may include a set of entries, where each entry corresponds to a face, herein referred to as a facial image, detected in an image in collection 107. An entry in database 108 may comprise a facial image, a pointer to the corresponding image in the collection 107 in which the facial image was detected, one or more tag values including a tag value for an assigned name, one or more facial recognition values, and an identification of a similarity group. Tags and similarity groups are described in greater detail below.

As used herein, "tag" refers to a word or phrase or other data used to identify or describe a facial image. A "facial recognition value" is a numerical value assigned to either a single facial landmark in a facial image, or an aggregate value computed based on factors including the individual facial landmarks. Therefore, the one or more facial recognition values in an entry of database 108 may comprise individual numerical values for a predetermined set of facial landmarks and an aggregate value. Any one of several facial recognition landmark evaluation mechanisms described in the literature may be used in assigning facial recognition values to the facial images in database 108. One or more of these facial recognition values in each of these facial image entries, for example, the aggregate value of the individual landmark facial recognition values, may be considered as representative of each image for purposes of forming similarity groups. This representative value is hereafter referred to as the "facial recognition template". In another embodiment, the several facial recognition values in each entry may be considered as a vector of values and a corresponding value computed for the vector can be used as a representative facial recognition template for the corresponding facial image. In yet another embodiment, the facial recognition template may itself be a vector comprising of individual facial recognition values for facial landmarks.

In some embodiments, entries in database of facial images 108 may not contain a facial image: in its place an entry may contain the location parameters of the facial image within the respective image in collection 107. For example, location parameters may be specified in two dimensions using pixel counts for the lower-left corner and upper-right corner of a rectangle encompassing the desired facial image. The pointer to the corresponding image in collection 107, included in each entry of database 108, may be implemented in various forms. For example and without limitation, it may be an index into collection 107, a memory reference to the corresponding image, or an indirect reference such as an index to a table that hashes references to images in collection 107.

A "similarity group" as used herein, is a set of images having face recognition template values within a predetermined range. For example, the similarity between two facial images can be measured by an Euclidean distance between the two corresponding facial recognition templates. Creation of similarity groups of facial images, using corresponding facial recognition templates, may be achieved by a clustering process. For example, well-known clustering techniques such as k-means clustering or c-means clustering can be used in the creation of similarity groups. A similarity group is intended to group facial images of a single person.

The face detection module 106 may be implemented in software, using one of many programming languages, for example, C. Module 106 canvasses images, or images specified by a user, to detect faces within those images. For example, when a user adds an album of digital photos to collection 107, in one embodiment, face detection module 106 may canvass each digital photo in that album to detect faces. When a face is detected, module 106 may make a digital copy of an area encompassing the detected face, for example, a rectangular area encompassing the detected facial image, for storing in the corresponding entry in database of facial images 108. For each new face detected in collection 107, face detection module 106 may create, or cause to create, a new entry in facial image database 108. In some cases, automatic face detection may not detect all faces in an image. Therefore, in some embodiments, the user may trigger face detection module 106 specifically to process a specified image. This is described below with respect to manually assisted face detection.

There are many face detection techniques described in the art. For example, elastic bunch graph matching as described in U.S. Pat. No. 6,222,939, using neural networks on gabor jets as described in U.S. Pat. No. 6,917,703, and face detection using boosted primitive features as described in U.S. Pat. No. 7,099,510 are some of the well known face detection techniques that may be used for purposes described herein. U.S. Pat. No. 6,222,939, U.S. Pat. No. 6,917,703, and U.S. Pat. No. 7,099,510 are herein incorporated by reference in their entirety. One skilled in the art will understand that any one of several of these techniques may be used in module 106 to detect faces in images of collection 107, while being consistent with the present invention.

The face recognition module 105 evaluates each facial image in database 108 to assign facial recognition values to a predetermined set of facial landmarks. Module 105 also computes a representative facial recognition template for each facial image in database 108. As described earlier, the face recognition template may be a single value or a vector of values. Several algorithms for face recognition, which may be used in embodiments of the present invention, are described in the art. For example, template values may be generated by projection of the facial images in a subspace defined by eigenfaces obtained through principal component analysis as described in M. Turk and A. Pentland, "Eigenfaces for Recognition", Journal of Cognitive Neuroscience, Vol. 3, No. 1, 1991, pp. 71-86. Another exemplary technique may be to create templates composed of gabor jets derived from local features of facial images as described in U.S. Pat. No. 6,301,370.

Similarity group module 104 includes processing of facial images in database of facial images 108 that have been assigned facial recognition templates by face detection module 105. Module 104 may group facial images having assigned facial recognition templates into similarity groups based on predetermined facial recognition template values or ranges of values. A similarity group is designed to ideally group together images of a single person. Practically, the efficacy of a similarity group depends to a substantial extent on the accuracy of several factors including the facial recognition template, and bounds for values defining the similarity group.

Server-side image layout generation module 103 includes the server-side component of the interface between database of facial images 108 and the graphical user interface (GUI) 121. Client-side image layout generation module 123 and server-side image layout generation module 103 combined may include functionality to facilitate user input, to exchange facial images from database 108 and images from collection 107 between client 120 and server 101. Server-side module 103 may, in addition, include the functionality to select and retrieve facial images from database 108, to retrieve images from collection 107 that are referenced in entries in database 108, and to interact with similarity group module 104, face recognition module 105, and face detection module 106 for purposes of enabling desired user activity in client 120.

Client 120 may comprise GUI 121, one or more input devices 122, and client-side image layout generation module 123. Client 120 may reside in the same computing platform as server 101, or on a different computing platform. One skilled in the art will also recognize that other software and hardware modules, not shown in 100, can be utilized in achieving the functionality of the present invention. GUI 121 may include a computer monitor and associated display software and hardware. Input devices 122 may include a keyboard, mouse or other input mechanism. Client-side image layout generation module 123 may include, in addition to the functionality described above, functionality to process facial images from database 108 and images from collection 107 for display in GUI 121, and any functionality required for optimizing the performance of GUI 121 and user interaction with GUI 121.

One skilled in the art will recognize that client-side image layout generation module 123 may be implemented in one of several programming languages, for example, in Java where client 120 supports Java capability. The server-side image layout generation module may also be implemented using one of many languages, as described earlier with respect to server software modules 102, but the implementation language and software platform may be selected with a view to facilitating the interaction of the client-side and server-side image layout generation modules 123 and 103 respectively. For example, in one embodiment where the present invention may include an interactive web application, modules 123 and 103 may be implemented in a language specifically tailored for such applications, for example, Asynchronous JavaScript and XML (AJAX).

FIG. 2 is a flowchart 200 showing the stages, in some embodiments, of updating database of facial images 108 with newly detected faces. The process defined by the flowchart 200 is generally executed in server 101. In stage 201, face detection module 106 processes newly added images to the collection of digital images 107. Face detection module 106 may be invoked to process the new images through many mechanisms, for example, by implementing a software trigger that invokes the face detection module 108 whenever a new album of digital photos is added to collection 107. Face detection module 106 is further described above with respect to functions of server software modules 102 including face detection module 106.

In stage 202, corresponding entries are created in database of facial images 108 for each face detected in the new images of collection 107. The creation of these entries may be done by the face detection module 106 software. As explained earlier with respect to face detection module 106, the entries in database 108 may or may not comprise a digital copy of the facial image that was detected.

Face recognition module 105, in stage 203, may process the newly added facial images in database of facial images 108. The processing by module 105 is explained in detail above with respect to server-side software modules 102 including face recognition module 105. In stage 203, functions of face recognition module 105 may include the assignment of values to a set of predetermined facial landmarks, and creating a facial recognition template for each of the facial images.

In stage 204, similarity group module 104 processes the facial images in database of facial images 108. The processing by module 104 is explained in detail above with respect to server-side software modules 102 including similarity groups module 104. A similarity group is intended to group facial images belonging to a single person. Towards this end similarity group module 104 may rely on predetermined ranges in facial recognition templates, and accuracy of the generation of facial recognition templates. When processing is completed by similarity group module 104, the facial images in database 108 have been assigned facial recognition values, facial recognition templates, and further have been assigned tentative groupings into similarity groups.

Enabling the user to name facial images, in some embodiments, may broadly proceed in two directions: the user may name faces based on albums, or the user may name faces by specifying the name of a person. FIG. 3 is a flowchart 300 showing, in one embodiment, stages in naming facial images based on albums. For example, in this embodiment, the user has chosen to name facial images for every face in every image in that album. Stage 301 allows the user to specify one or more albums that she wishes to process for the purpose of naming faces that occur in those images. Prior to stage 301, there may be one or more other stages (not shown) in which the user chooses to name faces based on albums, wherein a list of available albums from collection 107 is first presented to the user. Based on the input received in stage 301, in stage 302, an album is selected for processing. For example, the albums may be processed in order of the sequence specified by the user. Having selected an album, for example, module 103 may access the selected album in collection 107, and for each image in the selected album locate the facial images in database 108 corresponding to that image. Facial images thus located are grouped into a first set, for images in the selected album. Stages 303-305 represent the activity related to creating the first set. Stages 302-307 are repeated in processing images in albums specified by the user, to create the first set of facial images. The first set of facial images resulting after completion of the processing loop at stage 307 comprises detected faces in albums specified by the user.

In stage 308, the first set of facial images is sorted according to similarity group. This sorting would ideally group together facial images of a single person that occur in any image in an album specified by the user in stage 301. However, as described earlier, the automatic creation of similarity groups may not be entirely accurate in grouping images of only one person into a similarity group and in grouping the facial images of a person in a single similarity group.

In stages 309-311 the first set of facial images is displayed on the GUI 121, by similarity group. For example, similarity groups may be displayed one to a row or frame 401 as shown in FIG. 4, and user input 404 enabled. User input may be enabled, for example, to select or deselect each displayed facial image as belonging to the indicated similarity group, by a check box 403 as shown in FIG. 4. Also, user input for naming each similarity group may be facilitated by a pull-down list 402 of the first few closest names, also as shown in FIG. 4. For example, the list of closest names from which to select a name to identify a displayed similarity group may be derived from already named facial images of similarity groups within close range, comparing facial recognition template values, from the displayed similarity group. FIG. 5 is a flowchart of a method as described above, in one embodiment, to generate the list of closest name choices. The process shown in FIG. 5 is described in greater detail below. One skilled in the art will understand that many other techniques may be used to generate such pulldown lists of closest names.

In stages 312-313, user input is collected as to the inclusion of each of the displayed facial images in the corresponding similarity group, and also the name for each displayed similarity group. In stage 314, the database of facial images is updated based on user input collected in stages 312-313. The updates to the entries in database 108 may include, in some embodiments, updating of facial recognition templates. The updates may also include changes to assigned tags for some facial images, and/or changes to assigned similarity groups. FIG. 6 illustrates another example of a graphical user interface 600 in which a set of facial images (or thumbnail extracts of those facial images) are displayed in a filmstrip form 601. The facial images displayed in filmstrip form may comprise a representative image of each group of facial images. The filmstrip may be scrollable in either direction to view all of the available representative facial images in the selected grouping level. For example, as shown in FIG. 6, the filmstrip 601 may display representative images of each similarity group in all available albums. The thumbnail images in the filmstrip 601 may be arranged in a meaningful order. For example, the thumbnails may be arranged to assist the user in naming and confirming facial image clusters by displaying the thumbnail image of the cluster with the most facial images to be confirmed, and then placing the other thumbnails in the filmstrip in order of similarity to the first displayed cluster. The user may then select one of the thumbnail images in the filmstrip 601 to display the facial images in the corresponding similarity group 602. The user may then confirm the place of each of those images in the currently assigned similarity group, for example, by checking a corresponding box such as the one immediately below each one of the similarity group 602 facial images in FIG. 6. Also, as shown in FIG. 6 the user may either assign a name for the similarity group or confirm the name that is currently assigned. In addition, as shown in FIG. 6, suggestions of naming choices may be presented. The suggestions 603 may be based on already named facial images available in the database of facial images 108.

At the end of stage 314, the facial images in database 108 that had corresponding images in a user specified album in collection 107, have been updated with respect to their inclusion in a specific similarity group, and tag names. Facial images having a subject name tag that is confirmed by a user are herein referred to as an "already named" facial image.

FIG. 5 illustrates a process 500 to generate a list of possible names for a chosen similarity group. In stage 501, a face recognition template for the chosen similarity group is determined. As noted previously, each similarity group can have a corresponding face recognition template. In stage 502, similarity groups that include already named facial images available in the database of facial images 108 are searched. Similarity groups that have a face recognition template within a predetermined range can be used to obtain names from the already names images in those similarity groups. In stage 503, up to a predetermined number of names obtained in stage 502 can be listed as possible choices for the chosen similarity group. The listing can be ordered according to multiple criteria, including according to the difference between the face recognition templates of the chosen similarity group and the respective similarity groups with already named facial images.

Another approach the user may choose to name facial images is to specify a user name, and attempt to confirm images in a specified collection (for example, a subset of the collection 107, initially chosen by the system) as belonging to the specified user. Flowchart 700 in FIG. 7 is a sequence of stages, in one embodiment, through which a user may name facial images belonging to a single person.

In stage 701 a subject name is received by the system as input from the user. For example, the user may type in or select from a system-generated list using GUI 121, the name of a subject of whom she wishes to name facial images. Then, for example, client-side image layout module 123 may pass the user specified subject name to the server-side image layout generation module 103. Subsequent to receiving the subject name, for example, as in stage 702, the server-side module 103 may create a set, referred to here as the second set, of already named facial images in database 108 that match the subject name specified by the user. Thereafter, in stage 703, module 103 may determine one or more facial recognition template values corresponding to facial images in the second set. For example, as currently categorized in database 108, facial images in the second set belong to multiple similarity groups although these images may have been assigned a single subject name. Each of the similarity groups may have its own range of facial recognition template values defining the group. In stage 703, a set of ranges for facial recognition templates is determined. The ranges of the facial recognition templates determined in stage 703 are used in stage 704 to select a set, referred to as the third set, of yet unnamed facial images that are closest in facial recognition template value to those values chosen in stage 703. Thereafter, in stage 705, facial images in the second set (the already named facial images) and those in the third set (unnamed facial images) are arranged on the GUI. For example, in some embodiments, the second set may be laid out in a single cluster of images, and the third set may be laid out in multiple clusters where each cluster corresponds to a similarity group. The clusters of the third set may be, in some embodiments, organized on the GUI such that the proximity to the cluster of facial images of the second set is indicative of the closeness of the respective facial recognition templates. FIG. 8 is a GUI 800 produced according to flowchart 700, in one embodiment. For example, the cluster 801 having the images in the second set and the clusters 802-808 of the third set may be laid out as shown in FIG. 8. In stage 707, user input is received as to the inclusion of each displayed facial image in the indicated similarity group; user input is also received as to the inclusion of each displayed facial image in a set of images to be updated with the specified subject name. In stage 708, database 108 is updated according to the user input. For example, corresponding entries in database 108 may be updated by assigning or deleting the specified subject name from the entry, and also the similarity group information of entries may be updated.

In another embodiment, the process of flowchart 900 of FIG. 9 may be used to allow a user to name facial images based on subject name. Stages 901-903 correspond to stages 701-704 of flowchart 700 and a similar explanation applies. In stage 901 a set, hereafter referred to as the fourth set, of already named facial images are created. In stage 903, another set, hereafter referred to as the fifth set, of yet unnamed facial images is created. In stage 904, the fourth set is displayed in an area of the GUI. In stage 905, the fifth set is displayed in a separate area of the GUI where the individual facial images may be arranged in decreasing similarity to the fourth set. FIG. 10 is an example, in one embodiment, of a GUI according to flowchart 900. In this embodiment the fourth and fifth sets of facial images are displayed in different tabbed sheets, where only one may be made visible 1001 at a time as seen in FIG. 10. In stage 906, user input is received with respect to what individual facial images should be assigned the specified subject name. In stage 907, database 108 is updated according to the user input. For example, each one of the yet unnamed facial images that were selected by the user can be now updated with the subject name. Likewise, for each facial image in the tabbed sheet of already named facial images, the corresponding entry can be updated to remove the subject name if the user indicated as such. FIG. 6 is illustrative of a user interface that can be used for displaying and naming similarity clusters based on one or more names specified by a user.

In some situations, the face detection process itself may fail with respect to some faces. For example, face detection module 106 may not detect one or more faces in an image in collection 107. In this case, in one or its embodiments, the present invention provides the capability to manually assist the face detection process. FIG. 11 is illustrative of the GUI component of the manually-assisted face detection, in one embodiment. For example, the user is enabled to draw a bounding area, in this instance a bounding box 1101, around each face that she wants detected and recognized by the system. In addition, as shown in 1102, the use may display or enter additional descriptive data, for example, a subject name for such images. FIG. 12 shows a flowchart 1200 illustrating the process. In stages 1201 and 1202, an image from collection 107 is shown in the GUI and the user can define bounding areas around one or more faces. In stage 1203, the bounded area is processed by, for example, face detection module 106. One skilled in the art will understand that the same facial detection technique may be used in the automatic face detection as well as the manually-assisted face detection with slight modifications. For example, when manually assisted, the face detection software may simply attach a greater weight to facial landmark features identified within the defined area. When a face is detected in stage 1204, stage 1205 enables the user to provide additional information, for example a subject name with which to tag the facial image in database 108. In stage 1206, facial database 108 is updated with the detected face information as well as the user provided information including possibly a subject name.

In another embodiment, gender detection is used to assist the face recognition and naming process. Methods of gender detection in images are well known in the art. Gender detection may be used to determine the gender of facial images already assigned to a cluster. Having determined the gender of facial images in a cluster, the system can use that information to bias the face detection result for a newly added image. For example, the system may prevent or warn the user if a new facial image is added to a cluster, and the gender of the new image and the images already in the cluster are not consistent. In another embodiment, where images in a cluster are already tagged, a dictionary lookup may be used to determine the gender of the facial images in the cluster.

In another embodiment, the present invention provides a system to integrate collections of facial images maintained by different entities. When facial image collections are maintained separately by different entities, facial images of a particular person may be tagged differently between the separate collections. For example, the user having a first collection may tag facial images of John Smith as "John Smith", while another user having a second collection may tag his images of John Smith as "J. Smith". A simple aggregation of the two collections then may result in the same person appearing under different tags in the aggregated collection. The present invention provides a method to integrate facial images of separate collections, by comparing additional information elements in the comparison of image templates. For example and without limitation, some or all of the following information elements may be incorporated to image templates when two collections are being merged: facial features, gender detected from image, gender detected from a dictionary search, assigned names/tags, age, ethnic group, pose, accessories, geo coordinates and time (if available), and co-occurrence with other known facial images. The tags to be assigned to the facial images in the integrated collection may be determined by various ways of comparing the set of information elements. For example, numerical values may be assigned to each information element and the tags may be resolved automatically where the matching information elements exceed a predetermined numeric threshold, and may be resolved semi-automatically with manual intervention when the matching information elements do not exceed such a threshold.

EXAMPLE APPLICATIONS

In one of its embodiments, the present invention utilizes the facial image database 108 and related information to offer services personalized to users. For example, FIG. 13 shows flowchart 1300 that implements a personalized slideshow. In stage 1301 a user specifies a subject name, whereupon in stage 1302 the system locates corresponding facial images. Then in stages 1303-1305, for each located facial image, the system locates the corresponding image in collection 107 and displays it to the user in GUI 121. Using flowchart 1300, a user may display all or some images in collection 107 that have a facial image corresponding to the specified subject. In some embodiments, the information about the facial images in each image in collection 107 may be used to implement special effects relative to those facial images when displaying the corresponding image. For example, the location parameters stored in database 108 for a facial image may be used at the time of displaying the corresponding image in collection 107, to zoom in or magnify that area of the image, without additional computation to locate the boundaries of the face at the time of display.

In another embodiment, database 108 may be used for searching external image collections for images that may contain the likeness(es) of a specified person. FIG. 14 is a flowchart 1400 of a process that receives a subject name from a user in stage 1401, and identifies the set of facial images in database 108 assigned a matching name in stage 1402. Also in stage 1402, the system may determine one or more facial recognition templates corresponding to the chosen facial images, which may be used in the search in stage 1403. In stage 1403, external image collections may be searched to identify any images containing a facial image sufficiently close in terms of facial recognition templates to one of the facial images selected in stage 1402. For example, the search may involve face detection on each image, followed by face recognition to determine values for a set of predetermined facial landmarks, and then a matching process to one or more of the facial images selected in stage 1402. When a matching facial image is found, in one embodiment, the user may be alerted through some means including an automatically generated message, for example, an automatically generated email or text message to a registered contact address for the user. In another embodiment, the image with the matching facial image may be included in collection 107.

In another embodiment, a subject is allowed to object to his image being displayed and/or his image being displayed with identifying information such as name. FIG. 15 shows an example flowchart 1500 of operations in a user objection system, in one embodiment. In stage 1501, a display event concerning one user, for example, say subject X, occurs. Display events may include the addition to the image collection 107 of an image having the facial image of subject X, and/or the tagging of an image with subject X's information. Subject X may have pre-registered to receive notifications when a display event with predefined characteristics occurs. In stage 1502, based on configuration information including subject X's preferences it may be determined that subject X should be notified of the display event. In stage 1503, a notification is sent to subject X. A notification may be conveyed in any form including an email message to an address available for subject X, or an instant message to one or more addresses available for subject X. The message may contain a link, for example a uniform resource locator (URL) to a web page where subject X is expected to obtain further information and/or register his objections.

Having transmitted the notification, in stage 1504, a response may be received from subject X. The response may include subject X visiting the URL that was sent in the notification message. In stage 1505, the images and/or tags that caused the notification to be sent, are displayed to subject X so that he has sufficient information upon which to base his objections. For example, in some embodiments all of the images in collection 107 with tags matching that of subject X may be displayed, while some other embodiments may display only the images and tags that were the direct cause of the display event that triggered the notification to X. In stage 1506 X's input is received. Subject X may register his input using a series of checkboxes or using other input means. The input received may include X's choice as to whether the image should be deleted, whether the specified tags displayed, any tag modifications, whether X wishes the source of the images in question to be notified, and whether X wishes to be informed of the source of the images in question. In stage 1507, X's input choices may be validated to determine if he is authorized or otherwise capable of receiving the requested service. For example, only users satisfying a set of predetermined criteria may be allowed to request deletion of an image. If X is validated to request deletion of the image(s) or the deletion or modification of the tag information, then in stage 1508 such changes are effected in collection 107 and facial image database 108. For example, if X is authorized to request automatic removal of images tagged as him, then the image and the relevant tags may be removed from collection 107 and/or database 108. Depending on the level of X's authorization, his request to have the image deleted, or may result in a log entry being made to manually remove the image by the owners of collection 107. Also, depending on X's authorization, any tag changes requested may either be automatically made or logged for later consideration. In stage 1509, if X has the appropriate authorization, X may be informed of the location from which the image(s) in question was obtained. Finally in stage 1510, the source of the image(s) in question may be notified of X's objections. For example, an email may be automatically generated to the source containing X's objection and the image(s) in question.

Yet another embodiment may use the information in database 108 for purposes of providing users with restricted access to image collections. For example, a user may have access only to images in collection 107 that have his facial image. Alternatively, a user may be given access to a set of albums containing his facial image, or the facial image of one or more other predetermined set of persons. For example, in one embodiment, albums may be controlled based on shared keys, where the keys are distributed only to users satisfying a predetermined set of criteria. Flowchart 1600 of FIG. 16 shows stages for implementing such restricted access, in one embodiment. In stage 1601, the user may be authenticated to access images that have his facial image. Similarly, in some embodiments, a user may be authenticated to access images of one or more other persons. The user's privilege to access images of one or more other persons, may be defined in a configuration file accessible to the system, based on, for example, user identifiers, predefined user groups, and/or the access privileges set per album, image or subject name. In stage 1602, already named facial images in database 108 with a matching subject name may be retrieved. In stage 1603, collection 107 may be accessed based only on facial images retrieved in stage 1602. For example, each time the user attempts to access an image in collection 107, that access is validated by ensuring that a facial image retrieved in stage 1602 references the chosen image in collection 107.

In another embodiment, the present invention enables the user, as he assigns a tag to a facial image, to specify the level of exposure (i.e., an access level) desired for any images containing facial images of the person being tagged, and/or whether one or more tags specified for that person are displayed. In some embodiments, various levels of permissions may be set as access levels such that a set of images may be displayed to the public, to a predetermined group of users, or only to the owner of the images. Based on the access level, the same image may be displayed with or without selected tags. Also, as images are tagged, the tagging application may interact with other applications to exchange information. For example, during the tagging of one or more facial images, the tagging application may interact with a contact list application or an email system to exchange information that may be useful to one or both applications.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventors, and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method, comprising:
    detecting a first set of facial images in images from a collection of digital images;
    grouping the first set of facial images into similarity groups, wherein in each of the similarity groups facial recognition templates of facial images are within a predetermined range;

displaying facial images from a plurality of the similarity groups in a graphical user interface, wherein each of the similarity groups is substantially separately displayed;

receiving user input to confirm or reject individual facial images in one or more of the displayed similarity groups;

updating one or more of the displayed similarity groups based upon the user input; and storing the changed similarity groups in a facial images database.

2. The method of claim 1, further comprising:

receiving a subject name for one or more of the displayed similarity groups; and updating one or more of the displayed similarity groups with the subject name.

3. The method of claim 2, wherein the receiving a subject name includes:

enabling the user to select a name for at least one of the displayed similarity groups from a list of entries, each entry of the list of entries having at least one of a name and a facial image, wherein said each entry corresponds to one or more facial images associated with a name, and wherein the list of entries is ordered according to similarity to the at least one of the displayed similarity groups.

4. The method of claim 1, wherein displaying one or more of the similarity groups, comprises:

displaying representative facial images from each of the plurality of similarity groups in a selectable filmstrip layout;

selecting a representative facial image from the displayed representative facial images based on user input; and displaying facial images of at least one similarity group that correspond to the selected representative facial image.

5. A method of updating a facial image database from a collection of digital images, comprising:

receiving a subject name from a user;

retrieving a first set of facial images from at least one named similarity group of facial images stored in the facial images database, wherein a name associated with said at least one similarity group substantially matches the subject name;

determining a first facial recognition template for the first set;

retrieving a second set of facial images from one or more unnamed similarity groups in the facial images database, wherein the unnamed similarity groups have no associated name, and wherein facial recognition templates of the unnamed similarity groups substantially match the first facial recognition template;

displaying the first set in a graphical user interface;

displaying the second set in the graphical user interface;

receiving user input associated with the second set; and updating the second set according to the user input.

6. The method of claim 5, wherein displaying the first set comprises:

displaying the first set arranged in a cluster in the graphical user interface.

7. The method of claim 6, wherein displaying the second set comprises:

displaying the second set in the graphical user interface with each similarity group of the second set arranged in a separate cluster.

8. The method of claim 5, wherein receiving user input further includes one or more of:

rejecting one or more facial images based on the user input, wherein the rejected one or more facial images are not assigned the subject name;

rejecting one or more similarity groups of the second set based on the user input, wherein the rejected one or more similarity groups are not assigned said subject name; and confirming one or more similarity groups of the second set based on the user input.

9. The method of claim 5, wherein the updating the second set further includes:

assigning the subject name to facial images of similarity groups of the second set based on the user input.

10. The method of claim 5, wherein displaying the first set includes:

displaying the first set within a first area of the graphical user interface.

11. The method of claim 10, wherein displaying the second set includes:

displaying the second set in a second area of the graphical user interface, the second set ordered according to similarity to the first set.

12. A system, comprising:

a facial image database configured to store data pertaining to facial images detected in images from the digital image collection;

at least one graphical user interface;

at least one user input device that enables manipulation of one or both of the data and the images, through the at least one graphical user interface;

a face detection module configured to detect faces in images of the digital image collection and to store data pertaining to the detected faces in the facial image database;

a face recognition module configured to compute at least one facial recognition template for each facial image in the facial image database;

a similarity ranking module configured to group facial images in the facial image database according to respective facial recognition templates such that substantially similar facial images belong to one similarity group; and a display layout generation module configured to lay out the facial images to display a plurality of similarity groups, wherein the at least one user input device, the at least one graphical user interface, the digital image collection, and the facial image database are communicatively coupled to the face detection module, the face recognition module, the similarity ranking module, and the display layout generation module.

13. A method of accessing digital images from a collection of digital images, comprising:

receiving a subject name;

selecting a first set of facial images in a facial image database, wherein facial images in the first set are assigned the subject name; and finding digital images from the collection of digital images, wherein one or more similarity groups including the digital images were previously associated with a similarity group including the first set of facial images, wherein the one or more similarity groups do not have an associated subject name, and wherein facial recognition templates of the one or more similarity groups substantially match a facial recognition template of the first set.

14. The method in claim 13, further comprising:

displaying the digital images; and displaying special effects on at least one face in one or more displayed digital images, using data stored in the facial image database.

15. The method of claim 13, further comprising:
authenticating a user to access facial images assigned the subject name; and
allowing the user to access images in the digital image collection that were previously associated with the first set.

16. A method, comprising:
receiving a subject name from a user;
retrieving a first set of facial images from at least one named similarity group of facial images stored in the facial images database, wherein a name associated with said at least one similarity group substantially matches the subject name;
determining a first facial recognition template for the first set; and
retrieving a second set of facial images from one or more unnamed similarity groups in the facial images database, wherein the unnamed similarity groups have no associated name, and wherein facial recognition templates of the unnamed similarity groups substantially match the first facial recognition template.

17. The method of claim 16 comprising:
searching one or more digital image collections wherein the searching includes automatic face recognition using at least one of said first or said second set of facial images.

18. The method in claim 17, further comprising:
generating an alert when a matching image is found, wherein the matching image includes a facial image that substantially matches at least one facial image in at least one of the first or the second set of facial images.

19. The method of claim 18, further comprising:
associating a user with the subject name.

20. The method of claim 19, wherein the generating the alert includes:
finding a matching image, wherein the matching image includes a facial image that substantially matches at least one facial image in at least one of the first set or the second set of facial images;
detecting at least one of the predetermined types of display events in a posted image, wherein the posted image includes a matching facial image that substantially matches the at least one facial image;
notifying the user about the at least one of the predetermined types of display events; and
receiving an input choice from the user.

21. The method of claim 20, further comprising:
automatically deleting the posted image from one or more locations based on the input choice.

22. The method of claim 20, further comprising:
modifying one or more tags assigned to the posted image based on the input choice.

23. The method of claim 20, further comprising:
notifying one or more sources having the at least one image based on the input choice.

24. The method of claim 20, wherein finding a matching image includes:
detecting a facial image in the at least one image;
determining the facial image to represent the subject name; and
assigning a tag associating one or more of the subject name and the user to the at least one image.

* * * * *